United States Patent [19]
Haraguchi

[11] 3,871,012
[45] Mar. 11, 1975

[54] REBOUNDLESS FOCAL PLANE SHUTTER

[75] Inventor: Keisuke Haraguchi, Kamifukuoka, Japan

[73] Assignee: Asahi Kogaku Kogyo Kabushiki Kaisha, Tokyo-to, Japan

[22] Filed: Aug. 14, 1973

[21] Appl. No.: 388,294

[30] Foreign Application Priority Data
Aug. 30, 1972 Japan.............................. 47-100384

[52] U.S. Cl................................. 354/246, 354/252
[51] Int. Cl. ............................................ G03b 9/20
[58] Field of Search ........... 95/53 R, 55, 58, 59, 60; 354/246, 252

[56] References Cited
UNITED STATES PATENTS
| | | | |
|---|---|---|---|
| 2,975,689 | 3/1961 | Chatani................................. | 95/55 |
| 3,580,156 | 5/1971 | Loseries................................. | 95/60 |
| 3,628,438 | 12/1971 | Loseries................................. | 95/55 |
| 3,683,778 | 5/1970 | Weiss..................................... | 95/60 |

Primary Examiner—Fred L. Braun
Assistant Examiner—Russell E. Adams, Jr.
Attorney, Agent, or Firm—Woldner & Gross

[57] ABSTRACT

A reboundless focal plane shutter includes leading and trailing sets of shutter blades successively moveable between charged and discharged positions. Each set of shutter blades is provided with a damping mechanism including a recessed click pin and leading and trailing contact pins on opposite sides of the click pin and having tapered end faces, the pins being located on the shutter blade of maximum movement. A spring loaded ball detent is located in the path of movement of the pins and is in registering engagement with the recess when the click pin is in the shutter discharge position, the shutter movement and rebound being slowed as each pin engages the detent.

8 Claims, 8 Drawing Figures

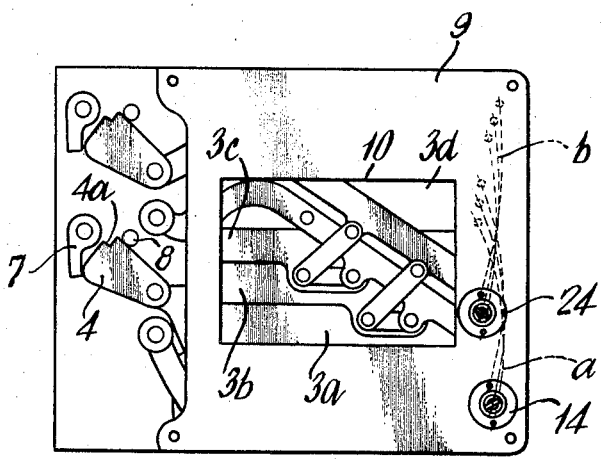
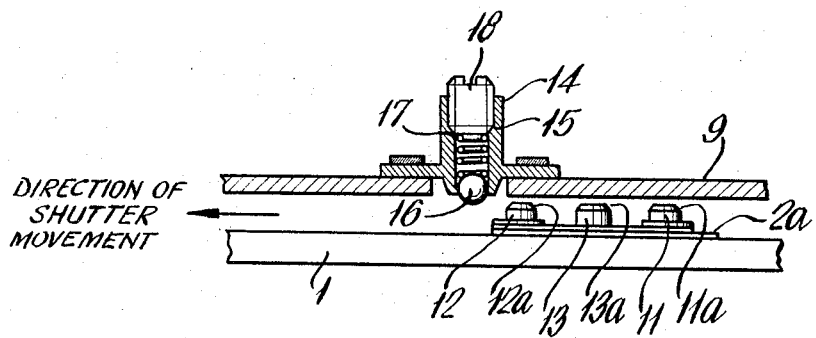
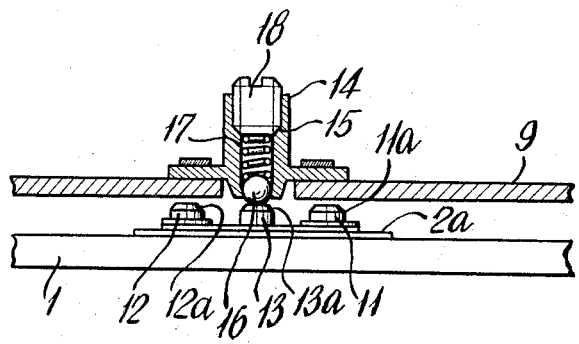

REBOUNDLESS FOCAL PLANE SHUTTER

BACKGROUND OF THE INVENTION

The present invention relates generally to improvements in camera shutters and it relates more particularly to a rebound preventing or damping device in a focal plane shutter. Characteristic of the focal plane shutter provided with metal shutter curtains so constructed that a plurality of metal blades are moved in mutually parallel paths by the swinging of a drive arm which is pivotally mounted on the side of a frame aperture together with an associated follower arm so as to effect the opening and closing of the shutter, is the presence of shutter rebound which may be often serious because of the high running velocity and the large mass of the shutter blades. Although devices for the prevention of shutter rebound have been proposed in the form of leaf springs or leaf springs in combination with associated pins such devices of the prior art possess many drawbacks and disadvantages in practical use.

SUMMARY OF THE INVENTION

It is a principal object of the present invention to provide an improved camera shutter.

Another object of the present invention is to provide an improved camera focal plane shutter of the metal blade type.

Still another object of the present invention is to provide an improved mechanism for eliminating or damping the rebound normally attendent to the operation of a metal blade focal plane shutter.

A further object of the present invention is to provide a mechanism of the above nature characterized by its efficiency, reliability, ruggedness and high versatility and adaptability.

The above and other objects of the present invention will become apparent from a reading of the following description taken in conjunction with the accompanying drawings which illustrate a preferred embodiment thereof.

In a sense, the present invention contemplates the provision of a reboundless focal plane camera shutter of the metal blade type which includes a set of metal blades moveable along overlapping parallel paths between a charged and discharged position and a damping mechanism comprising a click member having a recess in the face thereof and a detent member releasably engaging the recess when the click member is in the shutter discharged position and resiliently urged into engagement with the recess so that the click member is moveable to opposite sides of the detent member. A pair of contact members are disposed on opposite sides of the click member proximate its path of travel so as to engage the detent member during the shutter discharge movement proximate its discharge position, so as to slow the shutter movement. The contact and click members are short cylindrical posts with bevelled edges, the click member having an arcuate socket in its end face and the detent member is a ball supported in a hollow cylinder filled with heavy grease, and is spring urged to project from the cylinder. A damping mechanism is provided for the leading and trailing shutter curtains and eliminates any significant shutter rebound in an efficient and reliable manner.

BRIEF DESCRIPTION OF THE DRAWINGS

FIG. 4 is a view similar to FIG. 2 shown with the frame plate in position;

FIG. 5 is a longitudinal sectional view of the associated shutter damping mechanism with the shutter in charged condition;

FIG. 6 is a view similar to FIG. 5 with the shutter in discharged condition;

DESCRIPTION OF THE PREFERRED EMBODIMENT

Figure 1:
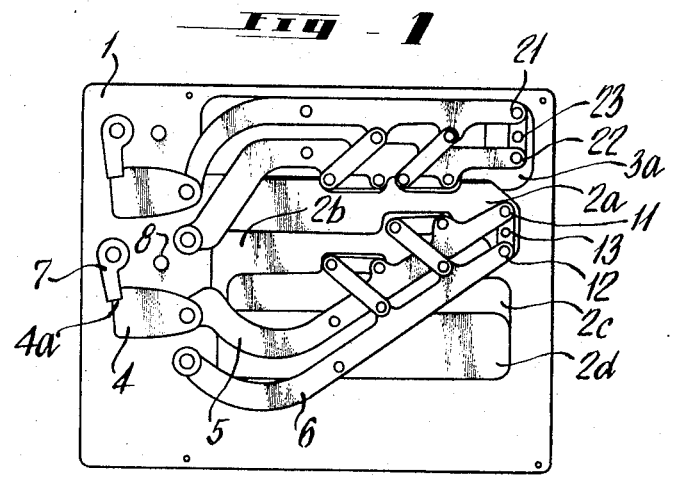
FIG. 1 is a front elevational view of a shutter embodying the present invention shown in charged condition and with the frame plate removed.
Figure 2:
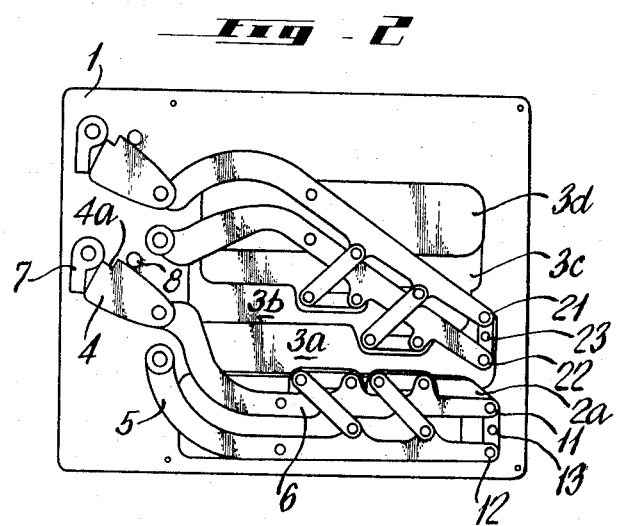
FIG. 2 is a view similar to FIG. 1, but shown in a shutter discharged condition.

Referring now to the drawings which illustrate a preferred embodiment of the present invention, the reference numeral 1 generally designates a shutter mounting or base plate which supports four cooperating metal shutter blades 2a, 2b, 2c and 2d defining a leading curtain and four cooperating metal shutter blades 3a, 3b, 3c and 3d which define and form a trailing curtain. The drive mechanisms for the leading and trailing curtains are of similar construction and therefore only the drive mechanism for the leading curtain will be described.

A drive plate 4 for the leading curtain is provided with a notch 4a and is normally spring biased in the known manner to rotate clockwise. A drive arm 5 is affixed to and swings with drive plate 4 and follower arm 6 is linked to arm 5 in a parallelogram relationship. A locking plate 7 is normally biased to rotate counter clockwise and is arranged so as to releasably engage the notch 4a of drive plate 4 whereby to hold the leading curtain in its cocked position. A stop 8 limits the path of movement of the leading curtain and a blade cover plate 9 parallel to base plate 1 prevents any possible oscillation from occurring when the curtains run and is provided with an aperture 10.

The parts which have been described above are common to known focal plane shutters having metal shutter curtains and a particular arrangement according to the present invention will be described below.

As seen in FIGS. 1 to 4, the drive arm 5 and the follower arm 6 are at their respective outer ends pivotally connected to the metal blade 2a and there are provided a pair of contact pins 11 and 12 located on the arms 5 and 6 respectively, at their respective outer pivot points and a click pin 13 is located between contact pins 11 and 12. The pins 11, 12 and 13 are linearly aligned in parallel to the direction in which the metal blade 2a moves as shown in FIGS. 5 and 6, and upper surface of the click pin 13 is provided with a recess as shown in enlarged scale in FIG. 7. As the shutter is operated, the contact pins 11, 12 and the click pin 13 return to their respective normal positions along the paths as indicated by broken lines in FIG. 4.

Figure 3:
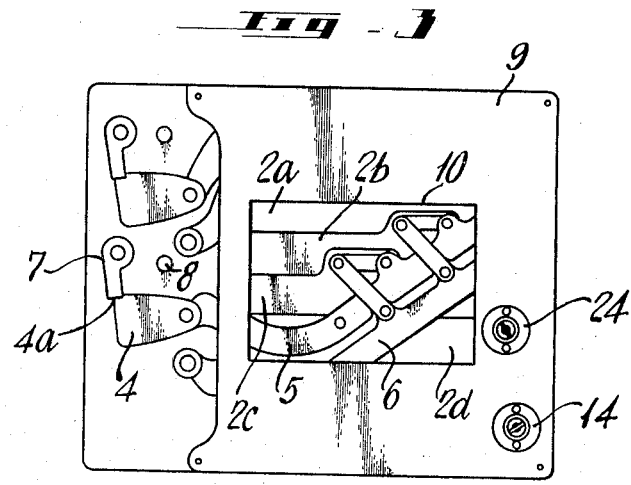
FIG. 3 is a view similar to FIG. 1, shown with the frame plate in position.
Figure 7:
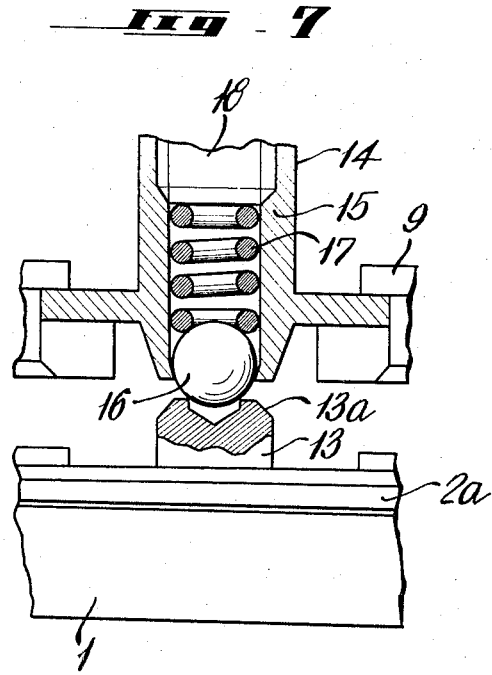
FIG. 7 is an enlarged sectional detail view of the detent and click member of the shutter.

An engaging mechanism is located on the blade cover plate 9, as shown in FIGS. 3 and 4, and cooperates with the engaging pin 13 at the final stage of the shutter curtain operation. Arrangement of this mechanism is shown by FIG. 7. A tubular guide cylinder 15 is mounted on the blade cover 9 in a sealed manner and has a longitudinally slideable therein a detent defining steel ball 16 so that the steel ball 16 is prevented by an inwardly directed lip at the inner lower end of the guide cylinder 15 from ejection. A spring 17 housed in guide cylinder 15 resiliently urges or biases the steel ball 16 to project from the guide cylinder 15. The spring 17 is arranged within said guide cylinder 15 and has its biasing force or compression adjustable by means of an adjustment screw 18 which is threaded into the upper portion of the guide cylinder 15 and bears on an end of spring 17. It should be noted that the contact pins 11 and 12 and the click pin 13 are provided with bevelled or round-cornered portions 11a, 12a and 13a, respectively, for smooth contact and clicking engagement with the steel ball 16. The guide cylinder 15 is filled with a grease of high viscosity or loading property at the position of the steel ball 16. 21, 22 and 23 designate contact pins and click pin, respectively, for the follower curtain and 24 designates an engaging mechanism for the follower curtain. The arrangement of these elements for the following curtain is similar to that of the elements for the leading curtain.

In the mechanism described above, the shutter cocking or charging as well as the shutter release are accomplished in the conventional or well known manner. With the shutter thus set or charged as shown in FIGS. 1 and 3, the metal blades 2a, 2b, 2c and 2d of the leading curtain are parallel extended while the metal blades 3a, 3b, 3c and 3d for the following curtain are superposed. Upon transfer from the shutter charged position to the shutter release, the leading curtain starts its advance first and after an interval corresponding to an appropriate exposure the following curtain starts.

Accordingly, the contact pins 11 and 12 and the click pin 13 are brought to their respective terminal positions along the paths a as indicated by broken lines in FIG. 4 and the contact pins 21 and 22 and the engaging pin 23 for the following curtain also are brought to their respective terminal positions along the paths b as indicated by broken lines in the same figure. The contact pins 11 and 12 and the click pin 13 are always out of contact and engagement with the engaging mechanism 24 of the following curtain since the engaging mechanism 24 is located out of the paths a.

The contact pin 12 comes first into contact with the steel ball 16 of the engagement mechanism 14 and in this contact the steel ball 16, instead of riding on upper surface of the contact pin 12, comes into contact with the round-cornered portion 22a and thereby reduces the force which drives the metal blades. It is to be noted that the metal blade 2a has passed the aperture plane or frame opening 10 when the contact pin 12 comes into contact with the steel ball 16. The steel ball 16 is rotatable around its own axis even when the contact pin 12 is brought into contact therewith and the contact pin 12 advances under the influence of this rotation of the steel ball 16. Then the click pin 13 advances the front into contact with the steel ball 16 and as a result the force to drive the metal blades is secondarily absorbed. The click pin 13 thus in contact with the steel ball 16 advances, forcing the ball 16 inwardly of the cylinder 15 (as seen in FIGS. 5 to 7) and the steel ball 16 is clicked into a recess formed in upper surface of the click pin 13 as shown by FIG. 6.

Although the drive plate 4 now comes into contact with the stop 8 so as to limit running of the leading curtain, the metal blades further advance from the state as shown by FIG. 5 since a running force of said metallic blades imparted by the flexing of the drive arm 5 is never reduced to zero under the influence of inertia. The steel ball 16 once clicked into the recess of the click pin 13 now leaves this recess as the click pin 13 advances and is brought into contact with the round-cornered portion 11a of the contact pin 11.

After the running force of the metal blades has been suppressed by the drive 4 in cooperation with the stop 8, it is only the inertia that remains to be absorbed by engagement of the contact pin 11 with the steel ball 16. As a result, any further advance or overrunning of the metal blades is prevented but the metal blades are subjected to a reactive force which tends to restore the drive arm. Thus the click pin 13 again comes into contact with the steel ball 16 which is, in turn, clicked into the recess therein. Nevertheless, a residual reaction force serves to disengage the recess from the steel ball 16 and the metal blades are now subjected to a force in the reverse direction with a result that the steel ball 16 is clicked again into the recess of the click pin 13. The metal blades have almost no momentum at this time point and are positively precisely stopped without overrunning.

Figure 8:
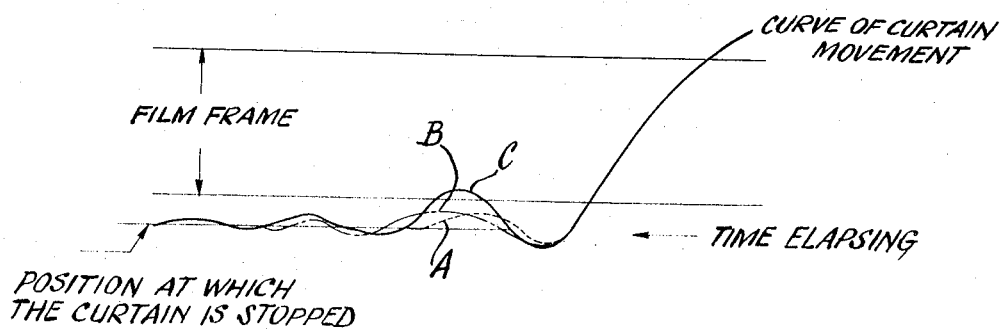
FIG. 8 is a graph comparing the movement of the conventional focal plane shutter with that of the present invention.

The manners in which shutters of the subject type rebound illustrated by FIG. 8 in which the curve A illustrates the manner of rebound of the shutter having the rebound preventing or damping device according to the present invention, the curve B illustrates the manner in which a shutter having the rebound preventing device of the prior art rebounds, and the curve C represents the manner of rebound of the shutter having no rebound preventing device. As is obvious from curve A which represents the result of numerous repeated experiments, all rebound may be effectively damped after approximately one cycle with the damping mechanism of the present invention and this cycle may be even further shortened.

Although the above description has been directed to the leading curtain, it is similarly applicable to the follower curtain. According to the present invention, it will be understood from the aforegoing description that the secondary and the subsequent rebound may be effectively absorbed under the effect of frictional braking and clicking between the engaging mechanism and the contact and click pins, respectively, and the amount of rebound may be reduced to a minimum, a result which has not been achieved by the rebound preventing devices of prior art. There is only a slight friction occurring between the steel ball and the contact and click pins since, according to the present invention, the steel ball is rotatable and has a uniform surface which is always coated with fresh grease, resulting in a higher durability of the shutter.

The present improved mechanism is advantageous also in that its construction is of great simplicity and employs a minimum of additional parts in comparison with the devices of the prior art which consist of leaf springs or leaf springs and pins positioned thereon.

The tendency of the blade cover 9 in the form of laminae which are curved would otherwise raise the problem that it is difficult to keep a force under which the steel ball 16 is brought into contact with the contact pins 11, 12 and the click pin 13, but this problem may be effectively resolved by regulating the adjusting screw 18 so as to vary the pressure of the spring 17. Compared to the devices of the prior art utilizing leaf springs in which flexing of these leaf springs present a certain orientation in the shutter charge and release, the device according to the present invention has no orientation, particularly in the shutter charge and release since a spring arranged perpendicularly to the shutter depresses the steel ball with a predetermined load.

While there has been described and illustrated a preferred embodiment of the present invention, it is apparent that numerous alterations, omissions and additions may be made without departing from the spirit thereof.

I claim:

1. A camera shutter comprising a metal blade type shutter member moveable between a charged and discharged position and a damping means including a click member moveable with said shutter member and having a recess in a face thereof and a detent member located in the path of said click member and resiliently urged into releasable engagement with said recess when said shutter member is in its discharged position to releasably retain said click member in the shutter discharged position, but permitting the movement thereof along said path to opposite sides of said detent member.

2. The camera shutter of claim 1 including a pair of contact members moveable with said click member and spaced from and located along opposite sides of said click member proximate the path thereof and moveable into separable engagement with said detent member.

3. The camera shutter of claim 2 including a cylinder having a bore in axial alignment with said recess when said shutter is in its discharged position, said detent member comprising a ball registering with said bore, and a compression spring housed in said bore and bearing on said ball to resiliently urge it to a position projecting from, but engaging said bore.

4. The camera shutter of claim 3 incuding means for adjusting the compression of said spring.

5. The camera shutter of claim 3 wherein said contact members comprise outwardly directed pins having bevelled outer corners.

6. The camera shutter of claim 5 wherein said click member comprises an outwardly directed pin between said contact pins and has a bevelled outer edge, said recess being of circular configuration and being formed in the outer end face of said click pin.

7. The camera shutter of claim 1 where said shutter member comprises successively releasable leading and trailing shutter members, said damping means comprises first and second damping mechanisms respectively being associated with each of said shutter members.

8. A rebound preventing device in a focal plane shutter wherein the opening and closing of the shutter is controlled by a plurality of parallelly moveable metal blades comprising two contact pins and a click pin therebetween located on at least one of said metal blades, said two contact pins and said click pin being arranged in parallel to a direction in which said respective metal blade moves and said click pin being provided in the upper surface with a recess, and an engaging mechanism located at a position at which the respective click pin is stopped at the final stage of the respective shutter operation and which includes a steel ball moveable into click engagement with said recess and dimensioned to come into contact with said click pin as said click pin moves and a spring urging said steel ball to click into said recess of said click pin.

* * * * *